March 15, 1927.
V. NYLUND
1,620,734
RIM CONTRACTOR AND EXPANDER
Filed Feb. 25, 1926
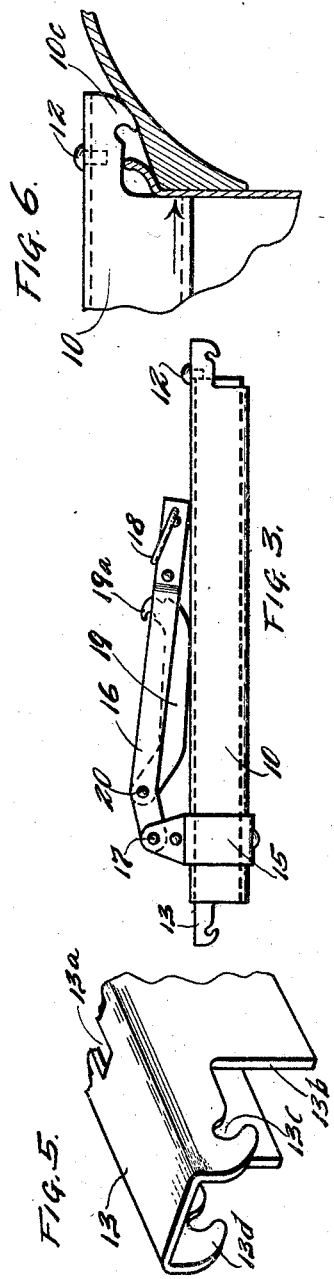
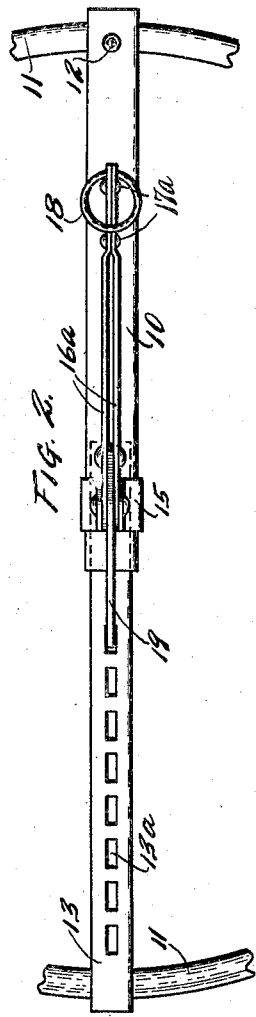
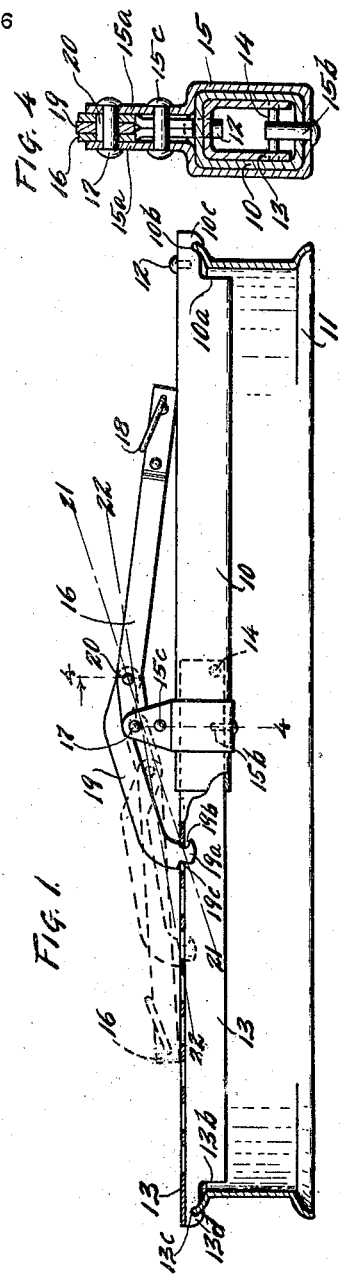
INVENTOR
VICTOR NYLUND
BY HIS ATTORNEYS Patented Mar. 15, 1927.

1,620,734

UNITED STATES PATENT OFFICE.

VICTOR NYLUND, OF MINNEAPOLIS, MINNESOTA.

RIM CONTRACTOR AND EXPANDER.

Application filed February 25, 1926. Serial No. 90,543.

This invention relates to an expanding and contracting implement and to such an implement particularly designed for expanding and contracting tire rims such as used on the well known automobile tires.

It is an object of this invention to provide such an implement or tool of simple and efficient construction comprising few parts, which can be collapsed into comparatively small space so as to be conveniently carried in an automobile or tool box.

It is another object of the invention to provide such a tool comprising a pair of members relatively movable longitudinally and adapted to engage the tire rim together with a lever connected to one of said members and having means adapted to engage the other, so as relatively to move said members, said lever and means being so disposed that when the lever is thrown to its limit of movement in either direction, it will be locked in position and no pawls or dogs will be necessary to hold the lever.

These and other objects and advantages of the invention will be fully set forth in the following description made in connection with the accompanying drawings, in which like reference characters refer to similar parts throughout the several views and in which:—

Fig. 1 is a view in side elevation of the device, a portion thereof being broken away and other parts shown in vertical section, the device being shown engaged with the rim edges in vertical section;

Fig. 2 is a top plan view of Fig. 1, also showing part of the rim;

Fig. 3 is a view in side elevation of the device in collapsed position;

Fig. 4 is a vertical section taken on line 4—4 of Fig. 1 as indicated by the arrow;

Fig. 5 is a perspective view of one end of the tool and Fig. 6 is a view in side elevation of the other end of the tool, showing the same used in connection with the tire and rim, Figs. 5 and 6 being shown on an enlarged scale.

Referring to the drawings, the device comprises a tube or hollow member 10. While said member 10 may be made of various shapes in cross section, in the embodiment of the invention illustrated it is shown as rectangular. Member 10 is cut away at its bottom portion adjacent one end to form a vertical shoulder 10$^a$ and the horizontal side portions above and adjacent said shoulder have curved notches 10$^b$ formed therein to fit over the edge of a standard rim 11 as shown in Fig. 1. The ends of said sides are curved inwardly, thus forming with the notches hook portions 10$^c$. Member 10 also has a screw or rivet 12 extending downwardly through its top side adjacent one end thereof, for a purpose to be later described. Another member 13 is provided which is of channel or U-shape in cross section, having its open side disposed downwardly, which member is of a size to fit snugly inside of member 10 and slide therein. The top of member 13 is provided with a plurality of spaced slots 13$^a$ and said member like the member 10 is cut away at its outer end to have thereon a vertical shoulder 13$^b$. The sides of the channel, above and adjacent said shoulder have curved notches 13$^c$ therein and the outer end of member 13 and said sides are curved inwardly, thus forming the end hook members 13$^d$. The member 13 has a pin or a rivet 14 extending between its sides at its inner end, for a purpose to be later described. A member 15 of plate or strap form and of comparatively narrow width extends around the bottom of member 10 adjacent its inner end and has its end portions bent upwardly above said member to form the spaced ears 15$^a$, said ears being connected by the rivet 15$^c$ which tightly clamps member 15 to member 10. A pin or rivet 15$^b$ extends upward through the bottom of members 10 and 15 into line with the pin 14. A lever 16 has one end pivoted on a pivot member 17 extending between ears 15 and illustrated as a headed rivet. The lever 16 is formed of a pair of flat bars 16$^a$ spaced at the lower end of said lever but bent towards each other and connected by the spaced rivets 17$^a$ at the outer side of said lever, said lever having a ring 18 passing therethrough close to its outer end. The lever 16 is bent laterally adjacent the pivot 17 and at said bend has pivotally connected thereto and disposed between the two portions 16$^a$ by a pivot member 20, a hook or pawl link 19. The member 19 is also bent laterally substantially in the same direction as the lever 16 and at a distance from pivot 20 substantially equal to the distance between the pivots 20 and 17, said member 19 being bent toward member 13. The member 19 at its free end is reduced in cross section and has formed thereon a hook 19$^a$ having a curved recess 19$^b$ in one side adapted to engage the end edges of slots 13ᵃ and having at its other side a surface 19ᶜ adapted to engage the other end edges of the slots 13ᵃ.

In operation, when the device is to be used to contract a rim, the same will be extended so as to be substantially the length of the rim diameter and the hooks 10ᶜ and 13ᵈ will be engaged over the edges of the rim at opposite sides thereof, the edges of the rim at said opposite sides being received in slots 10ᵇ and 13ᵉ respectively. With the tool so engaged, the lever 16 will be swung to the position shown in dotted lines in Fig. 1 and the hook 19ᵃ at the end of the member 19 engaged in one of the slots 13ᵃ. The lever will now be swung around to the right and member 19 will pull upon member 13 and cause the same to move relatively to member 10 and into the same. The amount of this movement will be substantially twice the distance between pivots 17 and 20. As said lever is swung over, the tool is thus contracted in length and the rim is contracted so that same will be broken at its joint and can thus be removed from the tire. When the lever 16 is swung to its limit of movement to the right, as shown in full lines in Fig. 1, the line of pull on said lever and member 19 will extend along the dot and dash line 21—21 shown in Fig. 1, which line extends from the point of engagement of recess 19ᵇ and the end of the engaged slot 13ᵃ through the center of pivot 20. It will be noted that this line passes below the center of the pivot 17 and in fact, below the body of said pivot. The lever is thus moved beyond a dead center position and is locked in position so that the stress tends to move the same downward against member 10. Members 19 and 16 form in effect a toggle which has been straightened in said position. The tool will thus hold the rim contracted and the tendency of the rim to return to normal position owing to its resiliency, will simply hold the tool in its locked position. No pawls or dogs are therefore necessary to hold lever 16 from reverse movement. Movement of members 13 and 10 will be sufficient to contract the rim as much as desired, without reengagement of member 19 with another slot 13ᵃ.

When it is desired to expand the rim to bring the edges thereof again into abutting relation, the tool will be lengthened by drawing member 13 from member 10 until the shoulders 10ᵃ and 13ᵇ abut the inner edges of rim 11 as shown in Fig. 6. The lever 16 will then be swung to a position shown in full lines in Fig. 1 which is at the right of its pivot 17, and the hook 19ᵃ will be inserted in one of the slots 13ᵃ. When lever 16 is swung to the left, the surface 19ᶜ will engage the outer end of the slot 13ᵃ, the shoulder adjacent surface 19ᶜ being on top of member 13. The lever 16 will now be swung to the left to the limit of its movement and will take the dotted line position shown in Fig. 1. This will move members 13 and 10 relatively so as to lengthen the tool, member 13 being pushed out of member 10. With the lever 16 in said position, it will be seen that the line of push or stress on the said lever and member 19 is along the dot and dash line 22—22 shown in Fig. 1, which line extends between the point of engagement of hook 19ᵃ with the end of slot 13ᵃ and the center of the pivot 20. It will be seen that this line extends below the center of and in fact, below the body of pivot 17. The lever is thus pushed beyond its dead center position with member 19 and is thus locked in position, the stress tending to move the lever forward downwardly. It is unnecessary, therefore, to have any holding pawl when moving members 13 and 10 apart. Ring 18 is provided so that the lever can be readily lifted from its position at the limit of its movement.

When the tool is not in use, it can be collapsed by sliding member 13 into member 10, the hook link 19 at this time being disengaged from member 13 and folded back between the sides 16ᵃ of the lever 16 as shown in Fig. 3. Member 13 is moved into member 10 until the inner end strikes the pin 12. The pins 14 and 15ᵇ are provided to prevent member 13 being withdrawn entirely from member 10. The pin 14 engages the member 15ᵇ and limits the outer movement of member 13.

From the above description it is seen that applicant has provided a very simple and efficient tool for expanding and contracting an article such as a tire rim. The members 13 and 10 are very strong and are held from any relative rotative movement. The parts are quite few and of simple construction and can easily be made from standard material. The device can be easily and quickly operated and very readily collapsed into small space. The same forms a very efficient device and one constituting quite an advance in the art.

It will, of course, be understood that various changes may be made in the form, details, proportions and arrangement of the parts, without departing from the scope of applicant's invention, which, generally stated, consists in a device capable of carrying out the objects above set forth, in the novel parts and combinations of parts disclosed and defined in the appended claims.

What is claimed is:

1. A device of the class described, having in combination, a rectangular tubular member having its lower portion cut away at one end to form spaced vertical shoulders, the sides of said member outward of said shoulders being formed as hooks adapted to engage over the edge of the tire rim, a channel shaped member slidable in said tubular member and having a plurality of spaced slots through its web and being cut away adjacent its outer end to form vertical surfaces on its flanges, said flanges outward of said surfaces being formed with hooks adapted to engage over the edge of the rim, a member secured to said tubular member adjacent its inner end having spaced upstanding ears, a lever comprising spaced bars pivoted between said ears and a hook link pivoted between the spaced bars of said lever and having a hook formed on its end adapted to engage in one end of said slots to pull on said channel member and to engage the other ends of said slots to push on said channel member whereby said channel member may be collapsed into said tubular member and said hook link can be collapsed between the sides of said lever with said lever on top of said tubular member.

2. A device of the class described having in combination, a rectangular tubular member having its lower portion cut away at one end to form spaced vertical shoulders, the sides of said member outward of said shoulders being formed as hooks adapted to engage over the edge of a tire rim, a channel shaped member slidable in said tubular member and having a plurality of spaced slots through its web and being cut away adjacent its outer end to form vertical surfaces on its flanges, said flanges outward of said surfaces being formed with hooks adapted to engage over the edge of a rim, stop means limiting the movement of said channel shaped member inwardly and outwardly of said tubular member, a member secured to said tubular member adjacent its inner end having upstanding lugs, a pivot extending between said lugs and secured therein, a lever fulcrumed on said pivot between said lugs and comprising spaced bars joined at their outer ends, a pawl link pivotally connected to said lever adjacent said pivot and having a hook formed on its free end adapted to engage either end of said slots, respectively, to pull or push on said channel member, said link being adapted to be disposed between the arms of said lever, whereby said device may be collapsed into substantially the length of said tubular member and said lever and link disposed in nested relation closely adjacent the same.

3. A device of the class described having in combination, a rectangular tubular member having its lower portion cut away at one end to form spaced vertical shoulders, the sides of said member outward of said shoulders being formed as hooks adapted to engage over the edge of a tire rim, a channel shaped member slidable in said tubular member and having a plurality of spaced slots through its web and being cut away adjacent its outer end to form vertical surfaces on its flanges, said flanges outward of said surfaces being formed with hooks adapted to engage over the edge of a rim, a member secured to said tubular member adjacent its inner end having spaced upstanding lugs a pivot extending between said lugs, a lever fulcrumed on said pivot, a pawl link pivotally connected to said lever adjacent said pivot and having a hook formed on its free end adapted to engage either end of said slots respectively to pull or push on said channel member, said lever being bent at an obtuse angle adjacent said pivot and said link being bent in an obtuse angle above said pivot, said pivot lever and link being so disposed that when said lever is in extreme position at either side of its pivot the line of stress thereon will pass below the centre of said pivot and said lever will be locked in position.

4. A device for contracting and expanding a rim of an automobile tire having in combination, two telescoping members relatively movable longitudinally and held from relative movement in other directions, each of said members having at its outer end hooks to engage over opposite edges of the rim and having a shoulder adjacent each hook adapted to abut the inner side of the rim, a lever pivotally secured to one of said members and having a single means pivoted thereto for detachably engaging the other member to pull or push upon the same as said lever is swung, respectively, in opposite directions, the pivot point of said lever and member being so disposed that when said lever is in extreme position, at either side of its pivot, the line of stress thereon through said lever and means will pass below the center of said pivot and said lever will be locked in position, said members extending substantially diametrically across said rim and lever being movable in a plane substantially at right angles to the plane of said rim.

In testimony whereof I affix my signature.

VICTOR NYLUND.